(12) United States Patent
Rotta et al.

(10) Patent No.: US 11,122,928 B2
(45) Date of Patent: Sep. 21, 2021

(54) DEVICE FOR HEATING AND FROTHING MILK AND WAND FOR SUCH A DEVICE

(71) Applicant: LUIGI LAVAZZA S.p.A., Turin (IT)

(72) Inventors: Denis Rotta, Turin (IT); Andrea Colonna, Turin (IT); Gabriele Luciano Picone, Turin (IT)

(73) Assignee: LUIGI LAVAZZA S.p.A, Turin (IT)

( * ) Notice: Subject to any disclaimer, the term of this patent is extended or adjusted under 35 U.S.C. 154(b) by 801 days.

(21) Appl. No.: 15/534,272

(22) PCT Filed: Dec. 7, 2015

(86) PCT No.: PCT/IB2015/059402
§ 371 (c)(1),
(2) Date: Jun. 8, 2017

(87) PCT Pub. No.: WO2016/097923
PCT Pub. Date: Jun. 23, 2016

(65) Prior Publication Data
US 2018/0353001 A1    Dec. 13, 2018

(30) Foreign Application Priority Data
Dec. 18, 2014    (IT) .......................... TO2014A001063

(51) Int. Cl.
*A47J 31/44*    (2006.01)
*A23F 5/26*    (2006.01)

(52) U.S. Cl.
CPC .............. *A47J 31/4489* (2013.01); *A23F 5/26* (2013.01)

(58) Field of Classification Search
CPC .... A47J 31/4489; A47J 31/4485; A47J 31/24; A47J 31/0657; A47J 31/30; A47J 31/34;
(Continued)

(56) References Cited

U.S. PATENT DOCUMENTS

| 4,800,805 A | * | 1/1989 | Mahlich | .............. | A47J 31/4489 |
| | | | | | 261/121.1 |
| 4,945,824 A | | 8/1990 | Borgmann | | |

(Continued)

FOREIGN PATENT DOCUMENTS

| DE | 88 16 009 U1 | 4/1990 | | |
| DE | 8816009 U1 | * 4/1990 | .......... | A47J 31/4403 |

(Continued)

OTHER PUBLICATIONS

Written Opinion of the International Searching Authority of PCT/IB2015/059402 dated Feb. 17, 2016.
(Continued)

*Primary Examiner* — Dana Ross
*Assistant Examiner* — Ket D Dang
(74) *Attorney, Agent, or Firm* — Sughrue Mion, PLLC

(57) ABSTRACT

The device (1) comprises a steam generator (2, 4), a compressed-air generator (9, 11) and a dispensing wand (10) connected or adapted to be connected to the steam generator (2, 4) and the compressed-air generator (9, 11) and adapted to be introduced into a receptacle (R) containing the milk (M) to be heated and frothed. The dispensing wand (10) defines first and second conduits (21, 22) separate from each other and having respective separate inlets (10a, 10b) for connection to the steam generator (2, 4) and the compressed-air generator (9, 11), respectively, as well as respective separate outlets (10c, 23; 10d, 24) for dispensing during use a flow of steam and a flow of compressed air, respectively, within the milk (M) contained in the receptacle (R), said outlets (23, 24) being arranged such that the flows of steam and compressed air exiting therefrom intersect each other.

15 Claims, 4 Drawing Sheets

(58) Field of Classification Search
CPC . A47J 31/40; A47J 31/465; A23F 5/26; Y10S 261/76; Y10S 261/75
USPC ....... 99/293, 290, 323.1, 275; 426/569, 594, 426/474, 519; 261/DIG. 76
See application file for complete search history.

(56) References Cited

U.S. PATENT DOCUMENTS

| | | | |
|---|---|---|---|
| 5,335,588 A | | 8/1994 | Mahlich |
| 6,203,837 B1 | * | 3/2001 | Kalenian .................. A23F 3/18 426/431 |
| 8,962,053 B2 | * | 2/2015 | Carbonini ................ A47J 31/56 426/443 |
| 2006/0272516 A1 | * | 12/2006 | Carbonini ........... A47J 31/4489 99/452 |
| 2010/0323074 A1 | | 12/2010 | Fliegauf et al. |
| 2013/0112083 A1 | * | 5/2013 | Douma ................ A47J 31/4485 99/294 |
| 2016/0249764 A1 | * | 9/2016 | Aardenburg .............. A23F 5/14 426/584 |
| 2017/0095111 A1 | * | 4/2017 | Riessbeck ................ A47J 31/46 |

FOREIGN PATENT DOCUMENTS

| | | |
|---|---|---|
| EP | 0 374 637 A1 | 6/1990 |
| EP | 0 575 762 A1 | 12/1993 |
| EP | 1 501 398 B1 | 9/2006 |
| EP | 2 263 502 A1 | 12/2010 |
| WO | 2011/151871 A1 | 12/2011 |

OTHER PUBLICATIONS

International Search Report of PCT/IB2015/059402 dated Feb. 17, 2016.

* cited by examiner

DEVICE FOR HEATING AND FROTHING MILK AND WAND FOR SUCH A DEVICE

CROSS REFERENCE TO RELATED APPLICATIONS

This application is a National Stage of Application No. PCT/IB2015/059402 filed Dec. 7, 2015, claiming priority based on Italian Patent Application No. TO2014A001063 filed Dec. 18, 2014, the contents of all of which are incorporated herein by reference in their entirety.

BACKGROUND OF THE INVENTION

Field of the Invention

The present invention relates to a device for heating and frothing milk, for use in preparing a hot beverage such as cappuccino and the like.

Background

More specifically, the present invention relates to a device of the type comprising
  steam generating means,
  compressed-air generating means, and
  a dispensing wand connected or adapted to be connected to the steam generating means and the compressed-air generating means and adapted to be introduced into a receptacle containing the milk to be heated and frothed.

A device of this type is known from the European patent application EP 1,501,398 A1. This known device comprises a boiler, acting as a steam source, the outlet of which is connected to a first inlet branch of a T-junction. A compressor motor which generates during operation a compressed-air flow is connected to a second inlet branch of the T-junction. The outlet branch of the T-junction is connected to the inlet of a dispensing wand, to which a flow of steam mixed with compressed air is supplied. This mixed flow is emitted at the bottom end of the wand, within the milk to be heated and frothed.

Regulation of the flowrate of the steam flow is performed by means of an electric isolating valve which is controlled by a control unit in ON/OFF mode or controlled so as to open for a predetermined time period, depending on the desired milk temperature set by the user.

The boiler used in this prior device for generation of the steam is a costly and bulky component which uses a lot of power. Moreover, mixing of the steam with the compressed air upstream of the dispensing wand, by means of a T-junction, involves the risk that the fluid which has a greater pressure, typically the compressed air, may rise back up the conduit of the fluid with a lower pressure, typically the steam.

It is also pointed out that, when the supply of compressed air is interrupted before supplying of the hot steam, the latter may rise back up the compressed-air supply pipe and may damage the air pump, unless a non-return value which prevents this backflow is arranged between the T-junction and the pump.

One object of the present invention is to provide an improved device for heating and frothing milk, which is able to overcome the drawbacks and limitations mentioned above of the devices according to the prior art.

SUMMARY OF THE INVENTION

This object, along with others, is achieved according to the invention with a device of the type defined initially, characterized primarily in that the dispensing wand defines first and second conduits which are separate from each other and have respective separate inlets for connection to the steam generating means and the compressed-air generating means, respectively, as well as respective separate outlets for dispensing during use a flow of steam and a flow of compressed air, respectively, within the milk contained in the aforementioned receptacle, said outlets being arranged such that the flows of steam and compressed air exiting therefrom intersect each other.

Owing to these characteristic features, the problems which may arise from the different pressures of the steam and the compressed air supplied to the milk to be heated and frothed are avoided. Moreover, the intersection of the steam flow and compressed-air flow introduced into the milk is able to produce an effective steam bubble "breaking" action, performed by the compressed-air flow, with consequent improvement in the milk frothing action.

In a currently preferred embodiment of the invention, the steam generating means comprises an electric vibration pump which is controlled by a control unit and has an intake inlet connected to a water tank and the outlet or delivery connected to an instantaneous heating device, which is likewise controlled by said unit. This unit is conveniently designed to modulate the flowrate of the electric vibration pump depending on the signals provided by a temperature sensor with which the dispensing wand may be advantageously provided for detecting the temperature of the milk in the aforementioned receptacle.

The invention also relates to a dispensing wand, the main characteristic features of which are defined herein.

BRIEF DESCRIPTION OF THE DRAWINGS

Further characteristic features and advantages of the invention will become clear from the following detailed description provided purely by way of a non-limiting example, with reference to the attached drawings in which:

In FIG. 1, the reference number 1 denotes overall a device according to the present invention for heating and frothing a quantity of milk M contained in a receptacle R, such as a glass or a cup, of any form and/or size.

Figure 1:
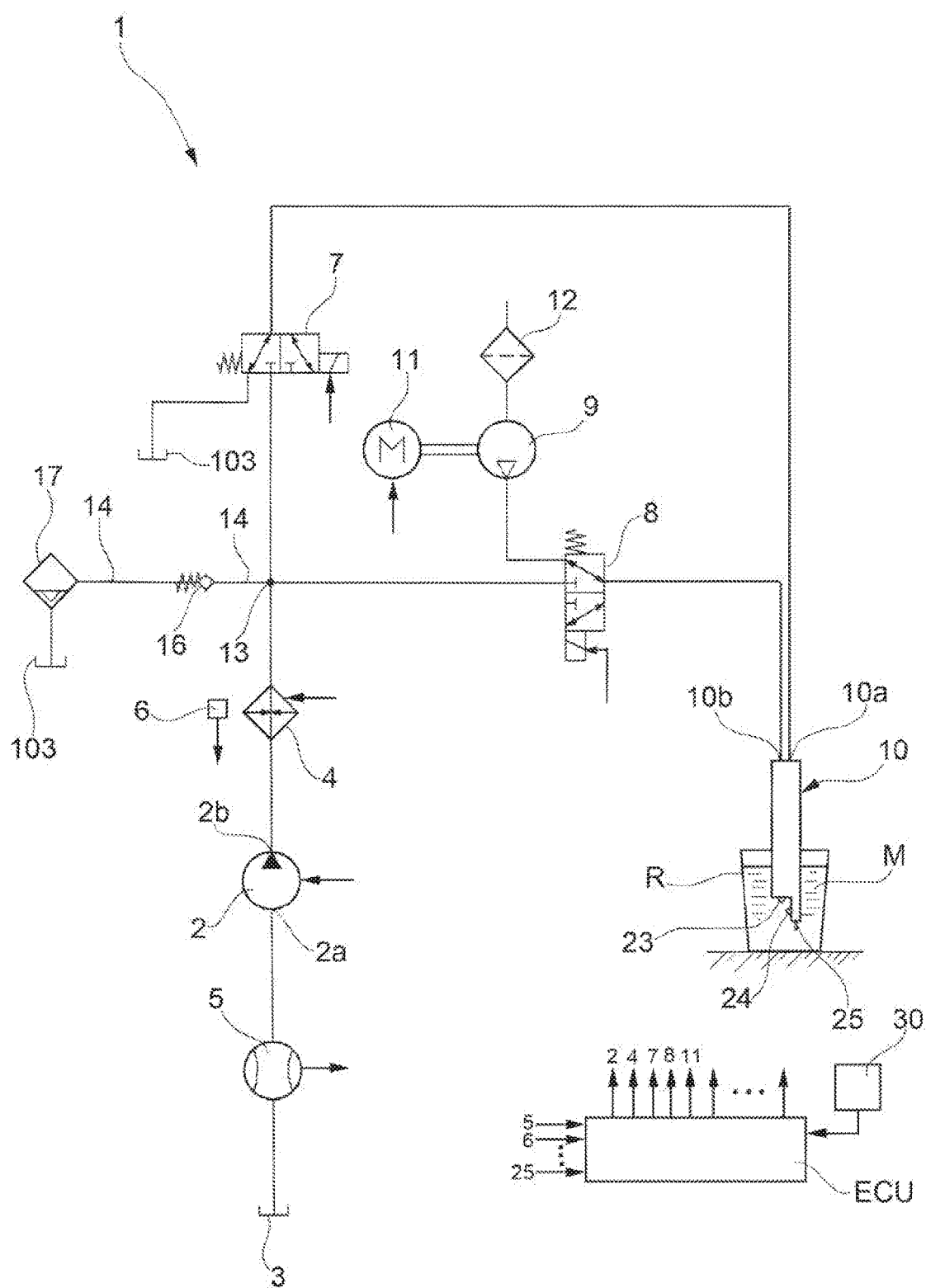
FIGS. 1 and 2 are electrical/fluid diagrams of two devices for heating and frothing milk according to the present invention.

The device 1 comprises an electric vibration pump 2, of the type known per se, having an intake inlet 2a connected to a water tank 3 and the outlet or delivery connected to the inlet of a heating device 4. This device 4 is of the so-called instantaneous type, otherwise known as a flow heater or transition heater.

A flow meter 5, for example of the turbine type, may be advantageously inserted in series with the electric pump 2, preferably between its intake inlet 2a and the tank 3, said flow meter being designed to provide electric signals indicating the flowrate of the water flowing through said electric pump.

An electric temperature sensor 6 may be conveniently associated with the heating device 4.

The outlet of the heating device 4 can be connected to an inlet 10a of a dispensing wand 10 via a first electric valve 7 which, in the embodiment shown, is of the 3-way, dual position, normally closed type.

The electric valve 7 is able to assume normally a condition, shown in FIG. 1, where it connects the inlet 10a of the dispensing wand 10 to a discharge container 103, such as a drip tray, and a second condition where it connects the inlet 10a of said wand 10 to the outlet of the instantaneous heating device 4.

The outlet of the heater 4 can also be connected to a second inlet 10b of the dispensing wand 10, via a second electric valve 8, which is also of the 3-way, dual position, normally closed type.

The electric valve 8 is able to assume normally the condition shown in FIG. 1, where it disconnects the inlet 10b of the wand 10 from the heating device 4 and connects said inlet 10b to the outlet of an air compressor 9 which can be rotationally operated by means of an electric motor 11.

The compressor 9 is intended to draw ambient air through a filter 12, so as to supply a pressurized-air flow to the wand 10, via the electric valve 8.

The electric valve 8 is able to assume a second condition where it disconnects the inlet 10b of the wand 10 from the compressor 9 and connects this inlet 10b to the outlet of the heating device 4, so as to transmit a flow of steam to said inlet 10b of the wand 10.

In FIG. 1 the reference number 13 denotes the "node" or junction for connection between the outlet of the heating device 4 and the inlets of the electric valves 7 and 8. A conduit 14 extends from this "node" 13 and passes through a one-way valve 16 with a pressure threshold and leads to a steam condenser 17 and to an associated storage container such as the aforementioned drip tray 103.

In the embodiment according to FIG. 1, the device 1 is of the stand-alone type, i.e. is not incorporated in a machine for the preparation of beverages by means of brewing, such as espresso coffee and the like. In this way the electric valve 7 may be omitted if necessary and the inlet 10a of the dispensing wand 10 could be directly connected to the outlet of the heating device 4. In fact, the electric isolating valve 7 may instead be required for example when the electric pump 2 and the heating device 4 are used in combination with a brewing unit, as shown in the diagram of FIG. 2, which will be described further below, in order to prevent in such a case the hot water and/or steam at the outlet of the heating device 4 from unduly reaching the dispensing wand 10 when the electric pump 2 and the heating device 4 are used to send to the brewing unit a flow of hot water and/or steam for preparation of a beverage, such as espresso coffee.

In any case, in a device 1 according to the invention, the electric valve 7 is not used to control the flowrate of the steam which in the device 1 serves to heat and froth the milk M contained in the receptacle R, this flowrate instead being controlled by means of suitable controlled operation of the electric vibration pump 2.

Figure 2:
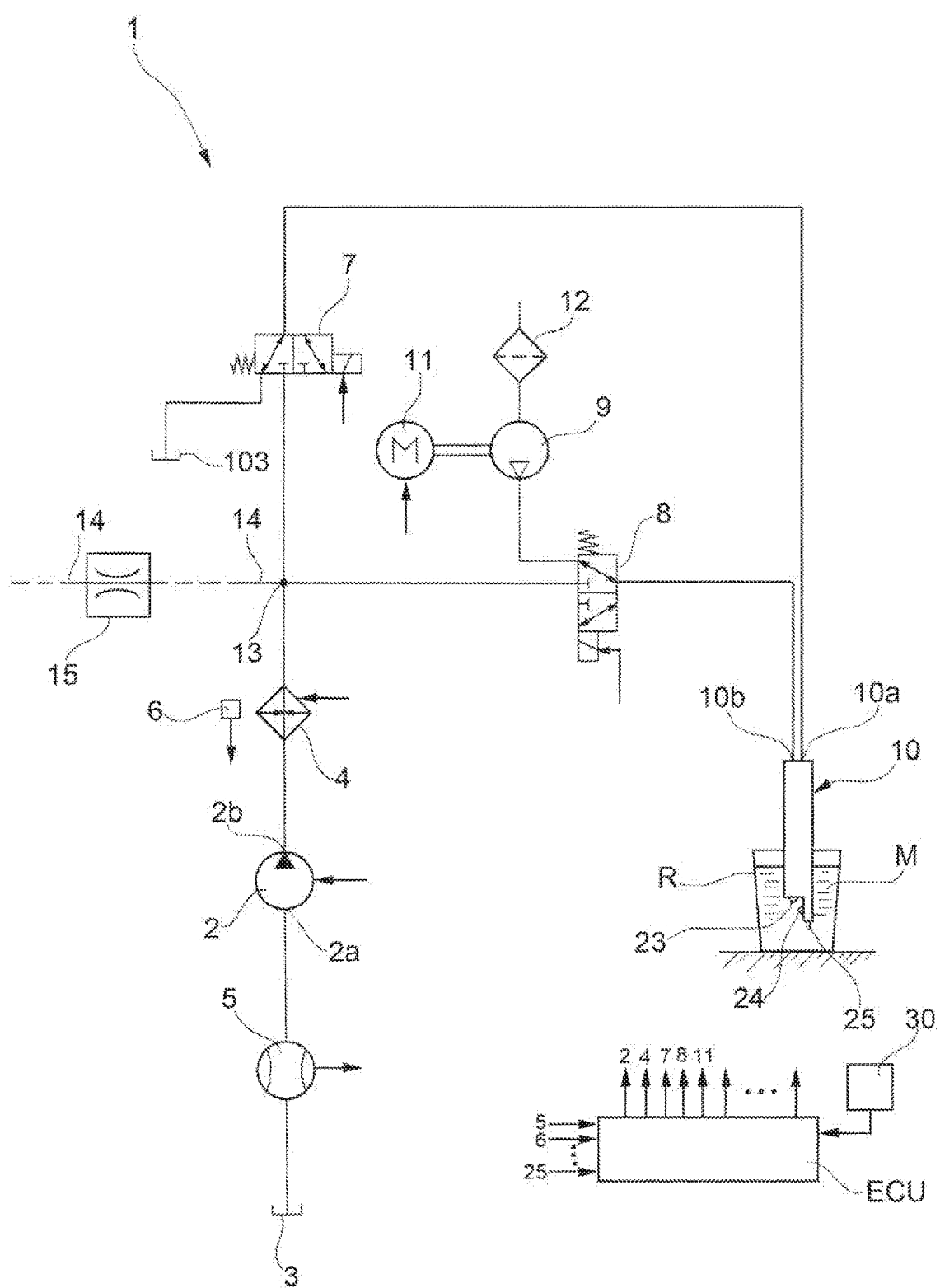
Figure 3:
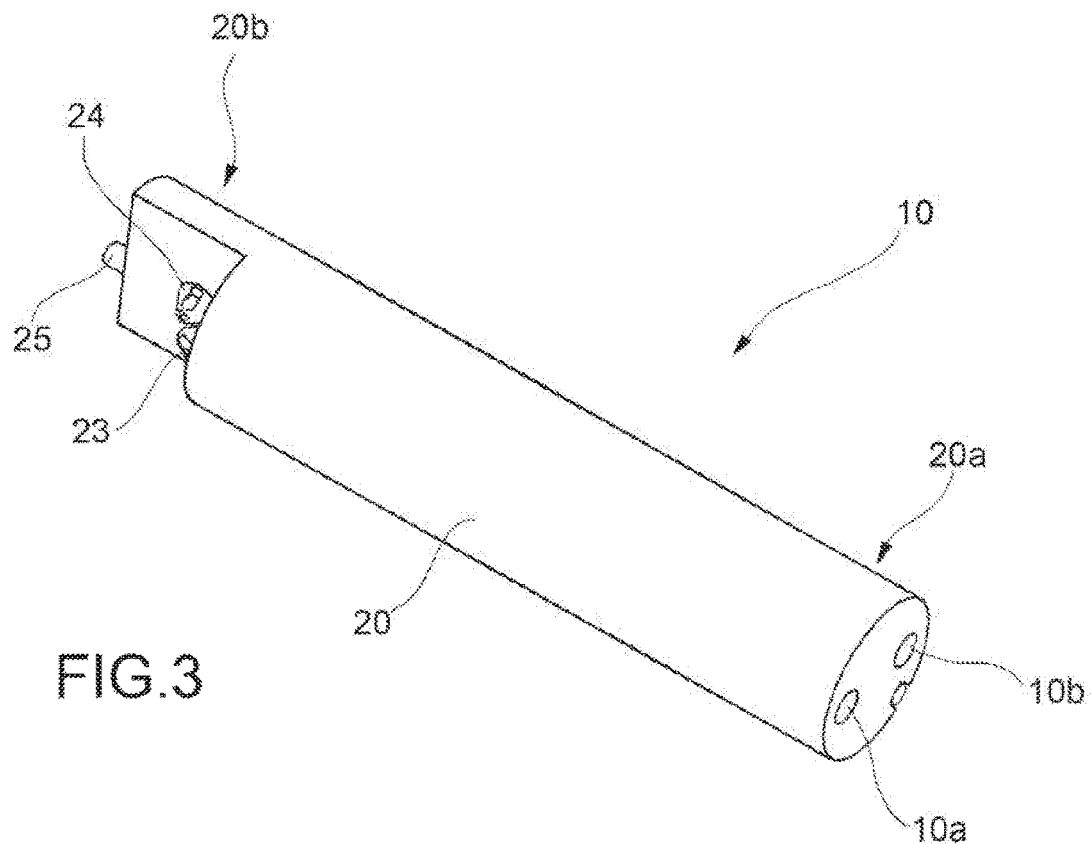
FIGS. 3 and 4 are perspective views of a dispensing wand for use in a device according to the present invention.
Figure 4:
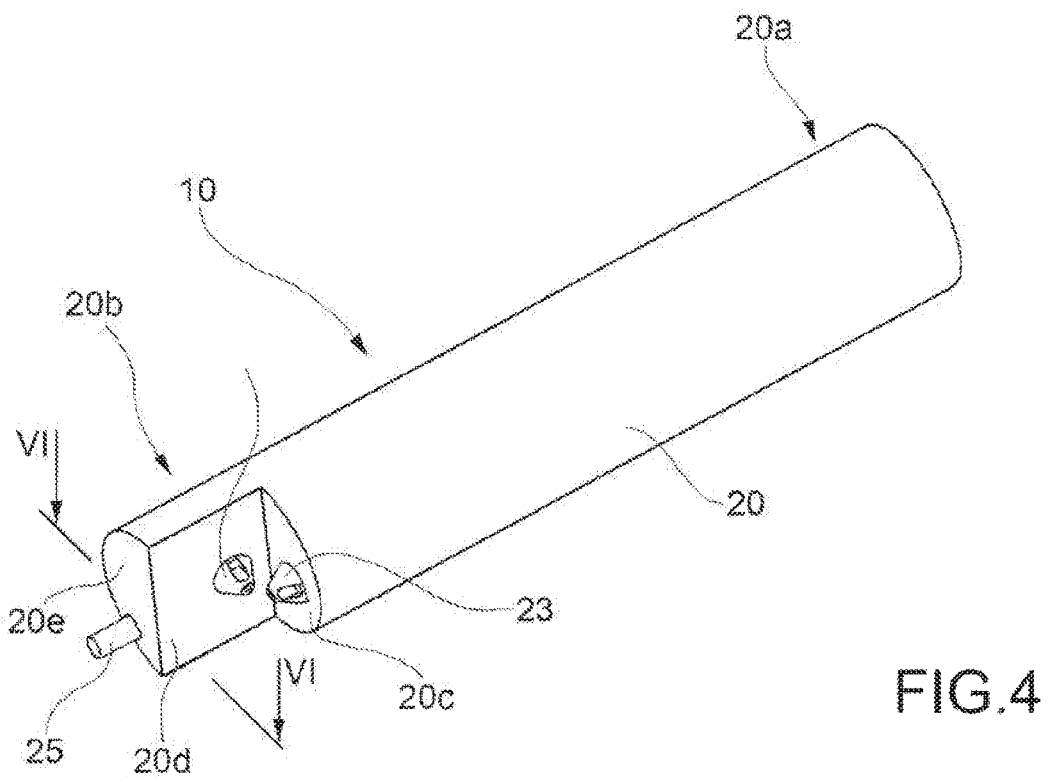
Figure 5:
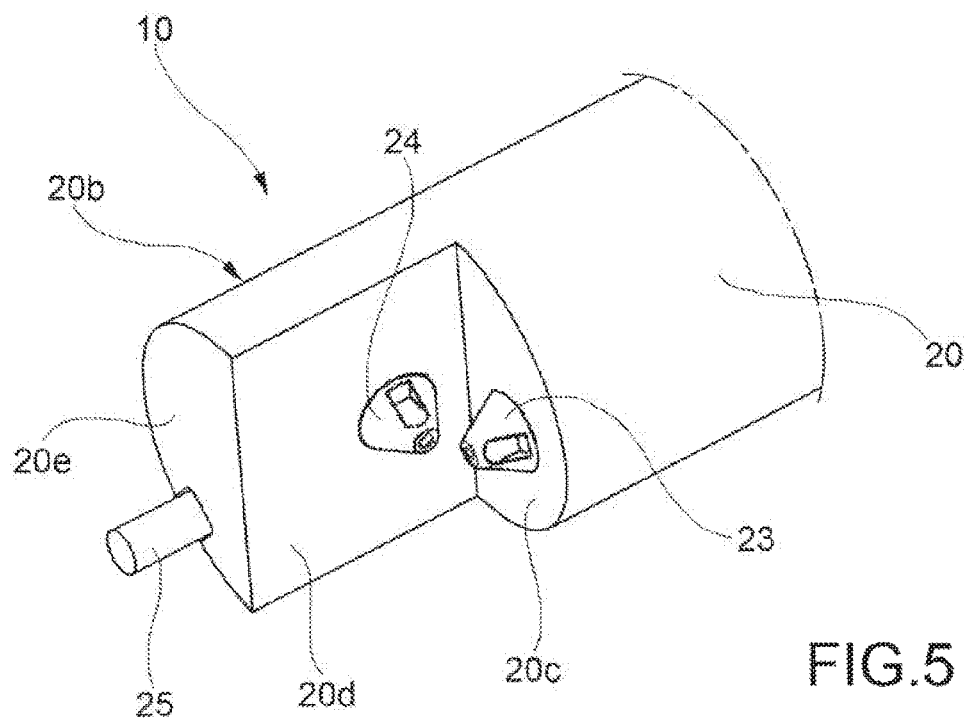
FIG. 5 is a partial view which shows on a larger scale a detail of the wand according to FIGS. 3 and 4.

FIG. 2 of the attached drawings shows in schematic form a device 1 according to the present invention, in an embodiment where it is incorporated in a machine for preparing hot beverages, in particular espresso coffee, where the electric pump 2 and the heater 4 are used also for the preparation of this beverage.

In this embodiment the device 1 has substantially the same configuration as in FIG. 1, but the junction 13, or the outlet of the heating device 4 has, extending therefrom, a line 14 intended to supply a flow of hot water and/or steam to a brewing unit 15 of the type known per se, for the preparation of a hot beverage, in particular espresso coffee.

In the embodiment according to FIG. 2, the one-way threshold valve 16 and the steam condenser 17 of the device according to FIG. 1 are no longer present.

As regards the rest, the device 1 according to FIG. 2 corresponds entirely and in all respects to that described with reference to FIG. 1. However, as already indicated further above, in the case of the device 1 according to FIG. 2, the presence of the electric isolating valve 7 is no longer simply optional, but is indeed necessary in order to disconnect the dispensing wand 10 from the outlet of the heating device 4 when the latter and the electric pump 2 are used together with the brewing unit 15 for the preparation of espresso coffee or some other hot beverage.

With reference to FIGS. 3 to 6, the dispensing wand 10 in the example shown comprises a body 20 of elongate shape, for example made of food-grade plastic, having a cylindrical general form.

The body 20 has an end 20a, the end surface or side of which has, formed therein, the inlet openings 10a and 10b connected to the outlets of the valves 7 and 8 in accordance with the diagrams shown in FIGS. 1 and 2.

The opposite end 20b of the body 20 in the example of embodiment shown forms a stepped recess defined by two surfaces or sides 20a and 20d which are essentially orthogonal to each other. The surface 20a is essentially parallel to the longitudinal direction of the body 20, while the surface 20c is essentially transverse to this direction.

The end 20b also has a further end surface or side 20e, which is essentially transverse and relative to which the surface 20c is axially set back, towards the end 20a of the body 20.

Figure 6:
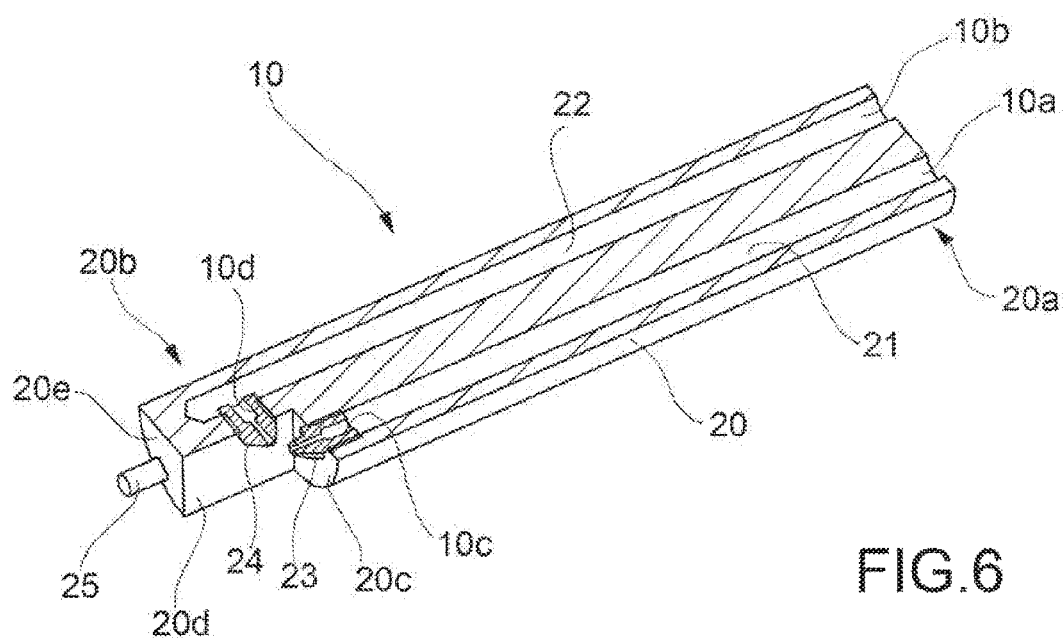
FIG. 6 is a cross-sectional view along the line VI-VI of FIG. 4.

Two longitudinal conduits 21 and 22, which are separate from each other, are formed inside the body 20 (see in particular FIG. 6).

The conduit 21 extends between the inlet opening 10a and an outlet opening 10c, which is formed in the surface 20c of the body 20 and has an associated ejection nozzle 23 intended during use to emit a flow or jet of steam in a direction essentially parallel to the longitudinal axis of the body 20.

The conduit 22 extends from the inlet opening 10b (FIG. 6) to a certain distance from the end surface or side 20e of the body 20 and is connected to a transverse outlet passage 10d which emerges in the surface or side 20d and inside which an ejector nozzle 24 is mounted.

The arrangement is such that, during use, when the distal end of the dispensing wand 10 is immersed in the milk R, the flows of vapour and compressed air exiting from the nozzles 23 and 24 intersect each other. Owing to this characteristic feature, the steam bubbles formed in the milk M are effectively broken up into smaller-size bubbles owing to the effect of the compressed air emitted through the nozzle 24.

The arrangement described above, whereby the wand 10 emits during use an axial flow of steam and a transverse flow of compressed air, is particularly convenient for use in small-size receptacles R.

For use in relatively larger size receptacles R, such as large cups or jugs, it is also possible to use a configuration in which the functions of the nozzles 23 and 24 are exchanged, namely where the steam is emitted through the transverse nozzle 24, while the compressed air is emitted through the longitudinal nozzle 23.

The wand 10 is preferably provided with an electric temperature sensor, such as that indicated by 25 in the drawings. In the embodiment shown, this temperature sensor is mounted on the end surface or side 20e of the wand, so as to be operationally immersed within the milk M to be frothed and so as to heat the inside of the receptacle R.

The device 1 according to the invention comprises an electronic unit, denoted by ECU in FIGS. 1 and 2.

The unit ECU has a plurality of inlets which are connected to the flow meter 5 and the temperature sensors 6 and 25.

This unit ECU also comprises a plurality of outlets connected to the electric vibration pump 2, the heating device 4 and the electric valves 7 and 9 and the motor 11 associated with the air compressor 9.

A setting and command device 30 is also connected to the unit ECU and may be used by the user to perform operation of the device 1 selectively in a plurality of different modes as regards both the temperature and degree of frothing of the milk which are required. An operating cycle of the device according to the invention will now be described, said cycle being performed in the same way for both the embodiments according to FIGS. 1 and 2.

In order to heat and froth the milk M contained in a receptacle R, the user immerses the dispensing wand 10 in the milk, so that the nozzles 23 and 24 and the temperature sensor 25 are submerged and located near the bottom of the receptacle R.

The user by means of the setting device 30 performs activation of the heating and frothing device 1 in the desired mode.

The control unit ECU correspondingly activates the electric pump 2, the heating device 4 and the motor 11 of the compressor 9 and also switches the electric valve 7 to the condition where it connects the outlet of the heating device 4 to the inlet 10a of the dispensing wand 10.

The wand 10 therefore receives both a flow of steam at the inlet 10a and (via the electric valve 8) a flow of compressed air at the inlet 10b. The nozzles 23 and 24 of the wand 10 therefore emit, into the milk M contained in the receptacle R, respective intersecting flows of steam and compressed air which are therefore mixed outside the device 1 as a whole, within the milk to be frothed.

The unit ECU receives the signals provided by the flow meter 5 and by the temperature sensors 6 and 25. Depending on the signals provided by these sensors and depending on the operating mode set by the user via the command device 30, the unit ECU may modulate the flowrate of the electric pump 2, the level of heating performed in the heating device 4 and the flowrate of compressed air supplied by the compressor/motor 9, 11.

In particular, by means of the temperature sensor 25 it is possible to check when the desired temperature for the milk M is reached.

By means of modulation of the compressed air flowrate it is possible to obtain milk with a layer of froth of variable height.

Once the milk M inside the receptacle R has been heated and frothed by the amount corresponding to the mode selected by the user, the control unit ECU deactivates the electric pump 2, the heating device 4 and the motor 11 of the compressor and may conveniently activate an operating cycle for cleaning and sanitization of the conduits and the nozzles of the dispensing wand 10.

For this purpose the unit ECU activates the electric pump 2 and the heating device 4 in order to generate a flow of steam and sets the electric valves 7 and 8 to the condition where they connect the outlet of the heater 4 to the inlets 10a and 10b, respectively, of the dispensing wand 10. In this condition the conduits 21 and 22 and the associated nozzles 23 and 24 of the dispensing wand 10 are crossed, simultaneously, or alternately, by flows of high-temperature steam which clean them, preventing possible blockages, and sanitize them.

If, during the cleaning and sanitization cycle, the wand 10 is introduced into a small empty container, the high-temperature steam emerging from the nozzles 23 and 24 is able to perform also at least partial cleaning of the external surface of the wand.

After the cleaning and sanitization cycle it is possible for the user to prepare a new quantity of heated and frothed milk. It is also possible, after this new preparation operation, for the user not to remove the heated and frothed milk and to leave the dispensing wand 10 immersed therein. In this condition (wand immersed in the milk following a cleaning cycle/preparation cycle sequence) it may happen that the milk rises back up from the receptacle R towards the electric valve 8, via the conduit 22 of the wand 10.

In order to avoid this drawback, the unit ECU may be set so as to recognize the occurrence of such a situation and activate in this case the compressor/motor 9, 11 for a predetermined period of time, for example a few seconds, in order to prevent the milk from rising back up towards the electric valve 8.

The unit ECU may recognize the condition where the wand is immersed in the hot milk by analyzing the signal provided by the temperature sensor 25: if, after preparation of hot/frothed milk, the temperature detected by the sensor 25 slowly decreases, the unit ECU assumes that the wand 10 is still immersed and activates the compressor/motor 9, 11.

If, instead, the temperature sensor 25 indicates a temperature which suddenly drops, the unit ECU assumes that the wand is no longer immersed in the hot beverage and avoids activating the compressor/motor 9, 11.

Obviously, without altering the principle of the invention, the embodiments and the constructional details may be greatly varied with respect to that described and illustrated purely by way of a non-limiting example, without thereby departing from the scope of the invention as defined in the accompanying claims.

The invention claimed is:

1. A device for heating and frothing milk, for use in preparing a hot beverage, comprising
   a steam generating unit,
   a compressed-air generating unit including a compressor, and
   a dispensing wand connected or adapted to be connected to the steam generating unit and the compressed-air generating unit and adapted to be introduced into a receptacle containing the milk to be heated and frothed;
   wherein the dispensing wand defines first and second conduits which are separate from each other and have respective separate inlets for connection to the steam generating unit and the compressed-air generating unit, respectively, as well as respective separate outlets for dispensing during use a flow of steam and a flow of compressed air, respectively, within the milk contained in said receptacle; said outlets being arranged such that the flows of steam and compressed air exiting from said wand intersect each other and are mixed outside the device.

2. The device according to claim 1, further comprising
   a temperature sensor associated with the dispensing wand for providing electric signals indicative of the temperature of the milk in said receptacle, and
   a control unit designed to control and coordinate in predetermined modes said steam generating unit and compressed-air generating unit depending on the signals provided by said temperature sensor;

the steam generating unit comprising an electric vibration pump having an intake inlet connected to a water tank and the outlet or delivery connected to an instantaneous heating device;

the control unit being designed to modulate a flow rate of said electric vibration pump depending on the signals provided by said temperature sensor.

3. The device according to claim 2, comprising a first electric valve arranged between the steam generating unit and the dispensing wand so as to selectively allow and prevent the flow of steam to said dispensing wand.

4. The device according to claim 2, further comprising a flow meter adapted to provide the control unit with signals indicative of the flow rate of the water flowing through said electric vibration pump.

5. The device according to claim 1, comprising a first electric valve arranged between the steam generating unit and the dispensing wand so as to selectively allow and prevent the flow of steam to said dispensing wand.

6. The device according to claim 1, comprising one further electric valve arranged between the compressed-air generating unit and the dispensing wand.

7. The device according to claim 6, comprising a first electric valve arranged between the steam generating unit and the dispensing wand so as to selectively allow and prevent the flow of steam to said dispensing wand, wherein said further electric valve is also connected to the outlet of a heating device and is adapted to selectively assume a first and a second conditions, respectively, in which it connects the compressed-air generating unit and the heating device, respectively, to the dispensing wand, so as to supply the second conduit of the dispensing wand with compressed air and steam, respectively.

8. The device according to claim 1, wherein the dispensing wand has an elongate shape and said conduits extend along a longitudinal direction thereof; the outlets of said conduits being arranged such that one outlet emits a first flow along said longitudinal direction and the other outlet emits a second flow along a direction intersecting said first flow.

9. The device according to claim 8, wherein said other outlet of the dispensing wand is arranged such that it is adapted to emit a flow orthogonal to said first flow.

10. The device according to claim 8, wherein the dispensing wand is connected to the steam generating unit and the compressed-air generating unit such that its outlets are adapted to emit the flow of steam along said longitudinal direction and the flow of compressed air along the direction intersecting the steam flow.

11. The device according to claim 8, wherein the dispensing wand is connected to the steam generating unit and the compressed-air generating unit such that its outlets are adapted to emit the flow of compressed air along said longitudinal direction and the flow of steam along the direction intersecting the flow of compressed air.

12. A machine for preparing espresso coffee, comprising a device for heating and frothing milk according to claim 1.

13. A dispensing wand for use in a device for heating and frothing milk, comprising steam generating means, and compressed-air generating means including a compressor, said wand comprising a body with an elongate shape having, defined therein, first and second conduits separate from one another and having respective separate inlets for connection to the steam generating unit and the compressed-air generating unit, respectively, as well as respective separate outlets for dispensing during use a flow of steam and a flow of compressed air within the milk contained in a receptacle; said outlets being arranged such that the flows of steam and compressed air exiting from said wand intersect each other.

14. The dispensing wand according to claim 13, wherein said conduits extend along a longitudinal direction of the wand; the outlets of said conduits being arranged such that one outlet emits a first flow along said longitudinal direction and an other outlet emits a second flow along a direction intersecting said first flow.

15. Dispensing wand according to claim 14, wherein said other outlet of the dispensing wand is arranged such that it is adapted to emit said second flow orthogonal to said first flow.

* * * * *